US010319141B2

(12) United States Patent
Wang (10) Patent No.: US 10,319,141 B2
(45) Date of Patent: Jun. 11, 2019

(54) METHOD AND SYSTEM FOR VISION BASED 3D RECONSTRUCTION AND OBJECT TRACKING

(71) Applicant: Apple Inc., Cupertino, CA (US)

(72) Inventor: Lejing Wang, Munich (DE)

(73) Assignee: Apple Inc., Cupertino, CA (US)

( * ) Notice: Subject to any disclaimer, the term of this patent is extended or adjusted under 35 U.S.C. 154(b) by 145 days.

(21) Appl. No.: 15/188,223

(22) Filed: Jun. 21, 2016

(65) Prior Publication Data

US 2017/0365092 A1 Dec. 21, 2017

(51) Int. Cl.
G06T 17/00 (2006.01)
G06T 7/80 (2017.01)
G06T 7/593 (2017.01)
H04N 5/225 (2006.01)
H04N 5/232 (2006.01)

(52) U.S. Cl.
CPC .............. *G06T 17/00* (2013.01); *G06T 7/593* (2017.01); *G06T 7/85* (2017.01); *H04N 5/2258* (2013.01); *H04N 5/23229* (2013.01)

(58) Field of Classification Search
CPC ............................... G06T 17/00; H04N 5/2258
USPC .......................... 348/139, 135–138, 140–142
See application file for complete search history.

(56) References Cited

U.S. PATENT DOCUMENTS

| 8,228,367 | B2 | 7/2012 | Johansson | |
|---|---|---|---|---|
| 8,306,260 | B2 | 11/2012 | Zhu | |
| 8,922,625 | B2 * | 12/2014 | Kim | G03B 35/10 348/47 |
| 9,083,960 | B2 | 7/2015 | Wagner | |
| 2003/0227615 | A1 * | 12/2003 | Montgomery | G01C 11/06 356/139.03 |
| 2011/0117958 | A1 * | 5/2011 | Kim | G03B 35/10 455/556.1 |
| 2011/0199335 | A1 | 8/2011 | Li | |
| 2017/0365092 | A1 * | 12/2017 | Wang | G06T 17/00 |

* cited by examiner

*Primary Examiner* — Paulos M Natnael
(74) *Attorney, Agent, or Firm* — Blank Rome LLP (57) ABSTRACT

Three dimensional model construction includes obtaining a first image of an object captured by a first camera facing a first direction, obtaining a second image of the object captured by a second camera facing a second direction, wherein the second camera captures the second image of the object as a reflection in a mirror, determining a virtual baseline distance between the first camera and a device including the second camera based on a location of the first camera, a known spatial relationship between the first camera and the device, and a reflected distance of the second camera, and generating at least a partial 3D model of the first object using the first image, the second image, and the virtual baseline distance.

20 Claims, 6 Drawing Sheets

METHOD AND SYSTEM FOR VISION BASED 3D RECONSTRUCTION AND OBJECT TRACKING

BACKGROUND

This disclosure relates generally to the field of digital image capture and processing, and more particularly to the field of vision based 3D reconstruction and object tracking.

Three dimensional reconstruction methods involve determining various intrinsic and extrinsic parameters of a camera in order to determine a depth of a given 2D image. Depending on the application, the accuracy and precision of the estimation may need to be somewhat strict. For example certain applications require extremely accurate estimation, and errors in the estimation may deem the applications unusable. Some examples of applications that rely on strict camera calibration include stereo imaging, depth estimation, multi-camera image fusion, and special geometry measurements.

Current methods for 3D reconstruction involve using a single camera. However, the result of single camera based methods of 3D reconstruction is that the 3D reconstruction may not be true to scale. The use of a stereo camera system may improve depth estimation. However, because precision of camera parameters is vital, the baseline of a typical stereo camera system may not be sufficient to provide accurate depth measurements for 3D reconstruction.

SUMMARY

In one embodiment, a method for 3D model construction is described. The method may include obtaining a first image of an object captured by a first camera facing a first direction, obtaining a second image of the object captured by a second camera facing a second direction, wherein the second camera captures the second image of the object as a reflection in a mirror, determining a virtual baseline distance between the first camera and the second camera based on a location of the first camera, a known spatial relationship between the first camera and at least a portion of the device, and a mirrored position of the second camera, and generating at least a partial 3D model of the first object using the first image, the second image, and the virtual baseline distance.

In another embodiment, the method may be embodied in computer executable program code and stored in a non-transitory storage device. In yet another embodiment, the method may be implemented in an electronic device having image capture capabilities.

DETAILED DESCRIPTION

This disclosure pertains to systems, methods, and computer readable media for 3D reconstruction. In general, techniques are disclosed for increasing accuracy in generation of a 3D model of an object by virtually increasing a baseline between two cameras in a multi-camera system. In one or more embodiments, the virtually increasing the baseline in the multi-camera system may provide better camera parameters for depth calculations. In one or more embodiments, a multicamera system may include two cameras facing different directions, such as opposite directions. For example, the multicamera system may include an electronic device that has a front facing camera and a back facing camera. One of the cameras may capture an image of an object to be modeled, while the other camera may capture an image of the object as reflected in the mirror. The result is that a virtual baseline between the two cameras is extended. In one or more embodiments, the increased virtual baseline may allow for more accurate depth measurements. Thus, one or both of the images capturing the object may be used to generate a reconstructed 3D model of the object.

In one or more embodiments, once the depth is determined based on the images from the two cameras, the 3D model may be updating using additional images captured by one of the cameras. In one or more embodiments, each additional image captured may be required to be at least partially overlapping with a previously captured image in order to accurately determine depth.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed embodiments. In this context, it should be understood that references to numbered drawing elements without associated identifiers (e.g., 100) refer to all instances of the drawing element with identifiers (e.g., 100*a* and 100*b*). Further, as part of this description, some of this disclosure's drawings may be provided in the form of a flow diagram. The boxes in any particular flow diagram may be presented in a particular order. However, it should be understood that the particular flow of any flow diagram is used only to exemplify one embodiment. In other embodiments, any of the various components depicted in the flow diagram may be deleted, or the components may be performed in a different order, or even concurrently. In addition, other embodiments may include additional steps not depicted as part of the flow diagram. The language used in this disclosure has been principally selected for readability and instructional purposes, and may not have been selected to delineate or circumscribe the disclosed subject matter. Reference in this disclosure to "one embodiment" or to "an embodiment" means that a particular feature, structure, or characteristic described in connection with the embodiment is included in at least one embodiment, and multiple references to "one embodiment" or to "an embodiment" should not be understood as necessarily all referring to the same embodiment or to different embodiments.

It should be appreciated that in the development of any actual implementation (as in any development project), numerous decisions must be made to achieve the developers' specific goals (e.g., compliance with system and business-related constraints), and that these goals will vary from one implementation to another. It will also be appreciated that such development efforts might be complex and time consuming, but would nevertheless be a routine undertaking for those of ordinary skill in the art of image capture having the benefit of this disclosure.

For purposes of this disclosure, the term "lens" refers to a lens assembly, which could include multiple lenses. In one or more embodiments, the lens may be moved to various positions to capture images at multiple depths and, as a result, multiple points of focus. Further in one or more embodiments, the lens may refer to any kind of lens, such as a telescopic lens or a wide angle lens. As such, the term lens can mean a single optical element or multiple elements configured into a stack or other arrangement.

For purposes of this disclosure, the term "camera" refers to a single lens assembly along with the sensor element and other circuitry utilized to capture an image. For purposes of this disclosure, two or more cameras may share a single sensor element and other circuitry, but include two different lens assemblies. However, in one or more embodiments, two or more cameras may include separate lens assemblies as well as separate sensor elements and circuitry.

Figure 1:
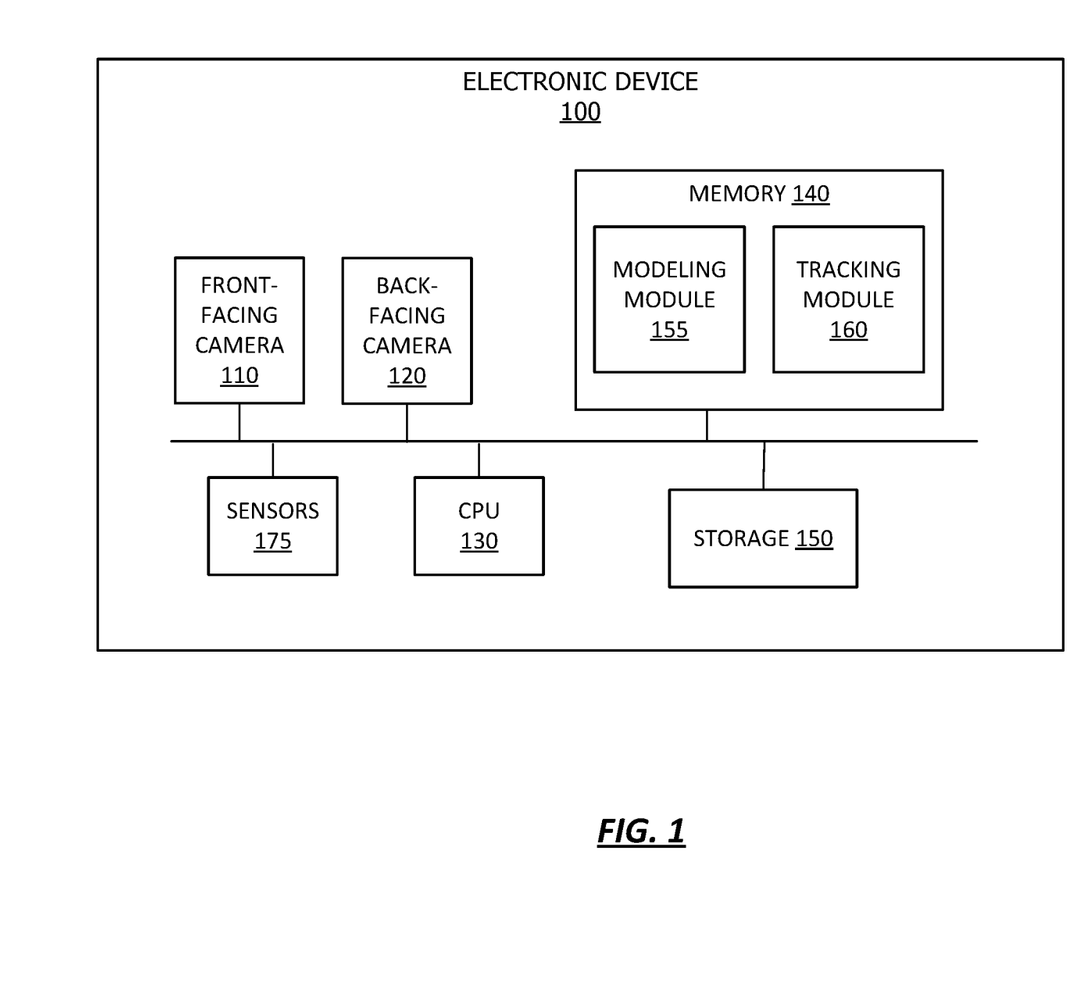
FIG. 1 shows, in block diagram form, a simplified electronic device according to one or more embodiments.

Referring to FIG. 1, a simplified block diagram of camera system 100 is depicted, in accordance with one or more embodiments of the disclosure. Camera system 100 may be part of a camera, such as a digital camera. Camera system 100 may also be part of a multifunctional device, such as a mobile phone, tablet computer, personal digital assistant, portable music/video player, or any other electronic device that includes a camera system.

FIG. 1 shows, in block diagram form, an overall view of a system diagram capable of supporting 3D reconstruction and object tracking, according to one or more embodiments. Specifically, FIG. 1 depicts an electronic device 100 that is a computer system. Electronic Device 100 may be connected to other network devices across a network, such as mobile devices, tablet devices, desktop devices, as well as network storage devices such as servers and the like. In various embodiments, Electronic Device 100 may comprise a desktop computer, a laptop computer, a video-game console, an embedded device, a mobile phone, tablet computer, personal digital assistant, portable music/video player, or any other electronic device that includes a camera system.

Electronic Device 100 may include a central processing unit (CPU) 130. Processor 130 may be a system-on-chip such as those found in mobile devices and include one or more dedicated graphics processing units (GPUs). Electronic Device 100 may also include a memory 140 and storage 150. Memory 140 and storage 150 may each include one or more different types of memory, which may be used for performing device functions in conjunction with CPU 130. For example, memory 140 and storage 150 may include cache, ROM, and/or RAM. Memory 140 and storage 150 may store various programming modules during execution, including modeling module 155 and tracking module 160. Electronic device 100 may also include one or more cameras, such as front-facing camera 110 and back-facing camera 120. Cameras 110 and 120 may each include an image sensor, a lens stack, and other components that may be used to capture images. In one or more embodiments, the cameras may be directed in different directions in the electronic device. For example, front-facing camera 110 may be positioned in or on a first surface of the electronic device 100, while the back-facing camera 120 may be positioned in or on a second surface of the electronic device 100. In one or more embodiments, the first and second surfaces may be opposite surfaces of the electronic device 100.

In one or more embodiments, tracking module 160 is configured to determine a depth of an object in images captured by the front-facing camera 110 and back-facing camera 120. In one or more embodiments, the tracking module 160 may track the object in part by determining a depth of the object in relation to one or more of the cameras capturing images of the object. An image may include, for example, video, live photos, and 3D captures. In one or more embodiments, tracking module 160 obtains images captured, for example, by front-facing camera 110 and back-facing camera 120 and determines depth information of one or more objects in the image. Tracking module 160 may, for example, compare features in the captured images and calculate depth based on the virtual baseline resulting from one of the cameras capturing an image of the object as a reflection in a mirror. In one or more embodiments, the images and/or depth information associated with objects in the images may be stored, for example, in storage 150.

In one or more embodiments, tracking module 160 once initial depth information is determined, tracking module 160 may initialize a tracking method that tracks the pose of one or both of front-facing camera 110 and back-facing camera 120 as additional images are captured. In one or more embodiments, as long as each subsequent image captured by the tracked camera includes at least part of the 3D reconstruction, depth information of the portions of the object captured in the subsequent images may be determined. Depth information may alternatively, or additionally, be determined using data from sensors 175. For example, sensors 175 may include various sensors that capture ambient light, luminosity, temperature, and the like.

In one or more embodiments, modeling module 155 may utilize the images captured, for example, by front-facing camera 110 and back-facing camera 120. The modeling module 155 may utilize the images along with depth or location information determined by tracking module 160 in order to generate a 3D reconstruction of the object. In one or more embodiments, the modeling module 155 may use additional captured images by a tracked camera to add on to the 3D model.

In one or more embodiments, storage 150 may include any storage media accessible by a computer during use to provide instructions and/or data to the computer, and may include multiple instances of a physical medium as if they were a single physical medium. For example, a machine-readable storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g., synchronous dynamic RAM (SDRAM), double data rate (DDR, DDR2, DDR3, etc.) SDRAM, low-power DDR (LPDDR2, etc.) SDRAM, RAMBUS DRAM (RDRAM) (RAM BUS is a registered trademark of Rambus Inc.), static RAM (SRAM)), ROM, non-volatile memory (e.g., Flash memory) accessible via a peripheral interface such as the USB interface, etc. Storage media may include micro-electro-mechanical systems (MEMS), as well as storage media accessible via a communication medium such as a network and/or a wireless link.

Figure 2:
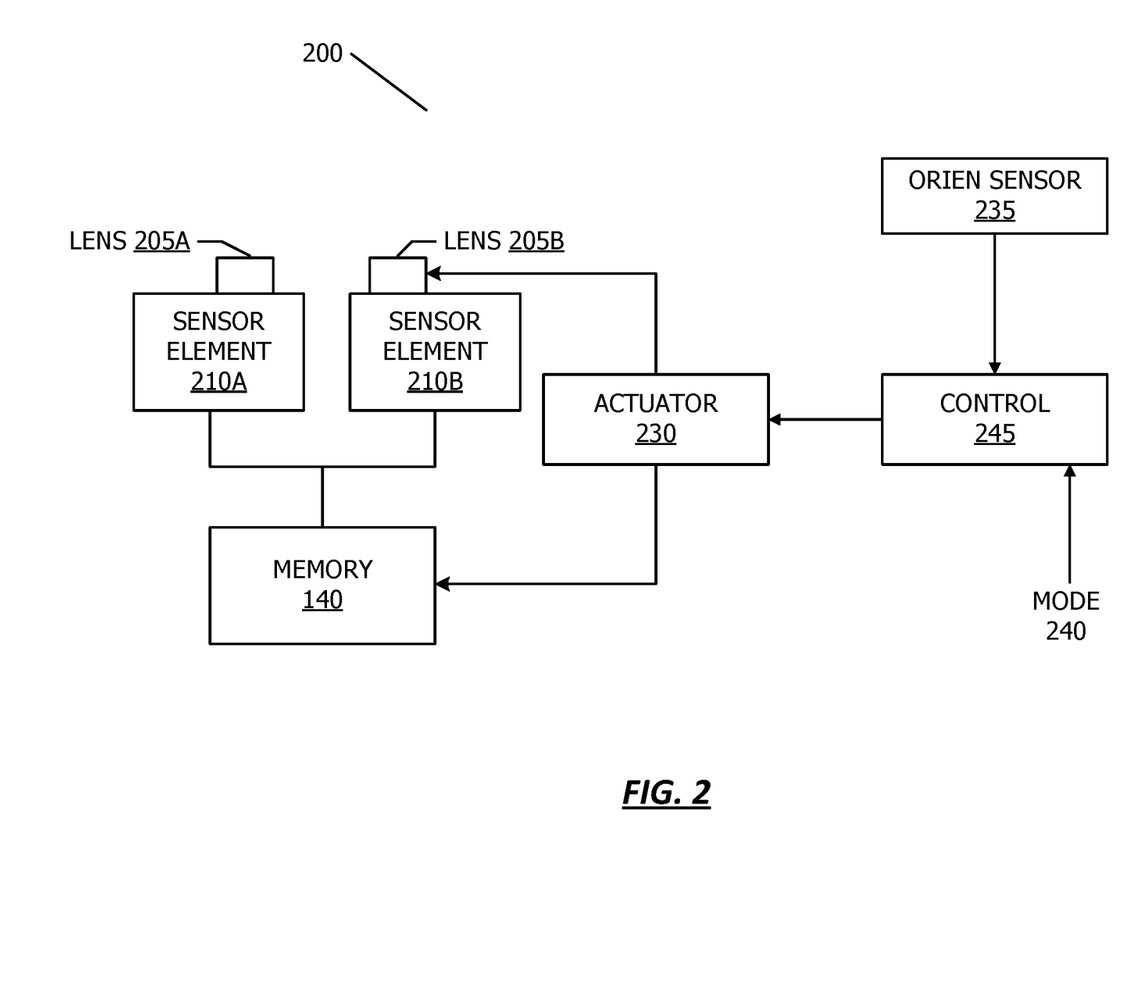
FIG. 2 shows, in block diagram form, an example multi camera system for 3D reconstruction, according to one or more embodiments.

FIG. 2 shows, in block diagram form, an example multi camera system for 3D reconstruction, according to one or more embodiments. Multi-camera system 200 may include one or more lenses 205 for each camera system. More specifically, as described above, lenses 205A and 205B may actually each include a lens assembly, which may include a number of optical lenses, each with various lens characteristics. For example, each lens may include its own physical imperfections that impact the quality of an image captured by the particular lens. When multiple lenses are combined, for example in the case of a compound lens, the various physical characteristics of the lenses may impact the characteristics of images captured through the lens assembly, such as focal points. In addition, each of lenses 205A and 205B may have similar characteristics, or may have different characteristics, such as a different depth of focus.

As depicted in FIG. 2, multi-camera system 200 may also include image sensor elements 210. Image sensor elements 210A and 210B may be a sensor that detects and conveys the information that constitutes an image. Light may flow through each of lenses 205A and 205B prior to being detected by image sensors 210A and 210B, respectively. The images may be stored, for example, in memory 140. In one or more embodiments, each of lens systems 205A and 205B may be associated with a different sensor element, or, one or more of the lens systems may share a sensor element.

Multi-camera system 200 may also include an actuator 230, an orientation sensor 235 and mode select input 240. In one or more embodiments, actuator 230 may manage control of one or more of the lens assemblies 205. For example, the actuator 230 may control focus and aperture size. Orientation sensor 235 and mode select input 240 may supply input to control unit 245. In one embodiment, camera system may use a charged coupled device (or a complementary metal-oxide semiconductor as image sensor 210), an electro-mechanical unit (e.g., a voice coil motor) as actuator 230 and an accelerometer as orientation sensor 235.

Figure 3:
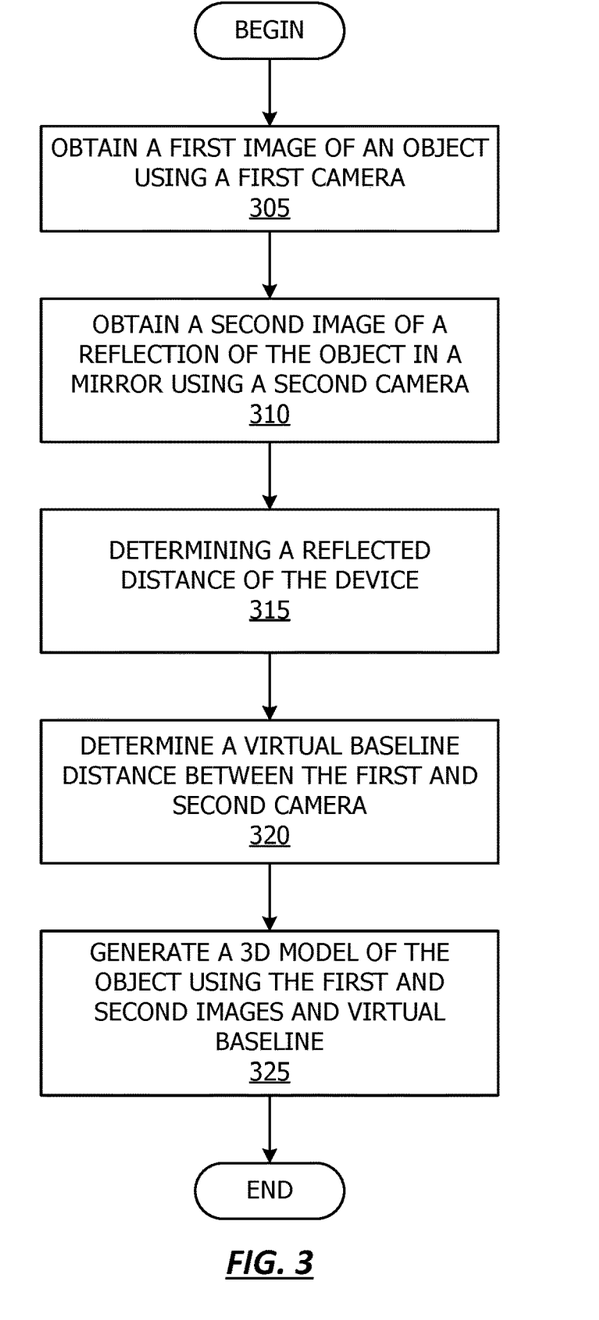
FIG. 3 shows, flow chart form, a 3D reconstruction method in accordance with one or more embodiments.

FIG. 3 shows, flow chart form, a 3D reconstruction method in accordance with one or more embodiments. The flow chart begins at 305 and the electronic device 100 obtains a first image of at least part of a real object using a first camera. At 310, the electronic device obtains a second image of at least part of the real object is a reflection in a mirror. In one or more embodiments, the first and second camera may be positioned in or on different surfaces of an electronic device, such that the first and second camera face different directions. Thus, while a back-facing camera may capture an image of an object, the front-facing camera may capture an image of the object as it is reflected in a mirror. Said another way, the image, or at least part of the image, captured by the second camera may be equivalent to an image captured from a virtual camera on the other side of the mirror. Thus, the second camera may be capturing light reflected by the mirror within a field of view that includes at least part of the object to be modeled. The mirror may be, for example, a planar mirror.

Capturing the image of the object as a reflection in a mirror may effectively move he optical center of the camera facing the mirror. In one or more embodiments, the first and second images must include an overlap of a field of view of the first camera and the second camera. Further, in one or more embodiments, the field of view of the first camera and the field of view of the second camera may both include a same portion of the real object.

The flow chart continues at 315, and a reflected distance of a device that includes the second camera is determined. Said another way, the electronic device determines an effective distance from which the camera is capturing the image. In one or more embodiments, the reflected distance indicates a virtual location of the camera as if it were capturing an image from the other side of the mirror from the electronic device. In one or more embodiments, the reflected distance may be determined in any number of ways. As an example, front-facing camera may be directed to the mirror. In capturing an image that includes the object to be modeled, the image may also include at least part of the electronic device 100. In one or more embodiments, the surface of the electronic device captured in the image may include a visual marker of a known size. For example, the surface of the electronic device 100 captured by the camera may include a logo or other marker of a size known to the electronic device. Based on the size of the visual marker in the image, the electronic device 100 may determine a virtual distance of the camera from the electronic device.

As another example, the same surface of the electronic device on which the camera directed to the mirror is positioned may also include a display. In one or more embodiments, the electronic device may generate and display a visual marker of a known size. Based on the size of the marker as depicted in the image captured in the reflection of the mirror, the electronic device 100 may determine the virtual distance of the camera from the device.

The flow chart continue at 320 and a virtual baseline distance is determined between the first and second camera. That is, the effective distance between the camera directly capturing an image of the object and the "virtual" camera capturing an image of the object within the mirror. In one or more embodiments, a spatial relationship between the first camera and camera at least a portion of the device that includes the second camera may be known. As an example, the first and second camera may be part of a same electronic device, as in FIG. 1. Thus, the virtual baseline may be determined based on the known spatial relationship between the first camera and a portion of the electronic device captured in the second image, and the determined effective distance of the virtual camera to the electronic device. The spatial relationship between the first camera and the virtual camera may be described in a number of ways. For example, the spatial relationship between the first camera and the second camera may be described using a six degrees of freedom pose, including 3 degrees of freedom translations, and 3 degrees of freedom rotations. The spatial relationship between the first camera and the virtual camera may also be described as a distance between the virtual camera center and a point coordinate system of a visual marker on the electronic device. Further, the spatial relationship between the first camera and the visual marker may also be described as six degrees of freedom.

The flowchart continues at 325, and the electronic device generates a 3D model of the object using the first and second images, and the virtual baseline. That is, the images captured from each camera include at least a portion of the object. Feature matching may be implemented to determine a 3D positions of the matched image features with respect to the determined spatial relationship of the two cameras.

In one or more embodiments the 3D model may be generated in a number of ways. For example, feature extraction may be utilized to identify features in the first and second images. The extracted features may be matched against each other to determine corresponding features in the first and second images. In one or more embodiments, the image captured by the second camera may need to be flipped, as it is captured as a reflection in a mirror. The 3D positions of the matched image features may be determined based on the spatial relationship between the first camera and the virtual location of the second camera.

Figure 4:
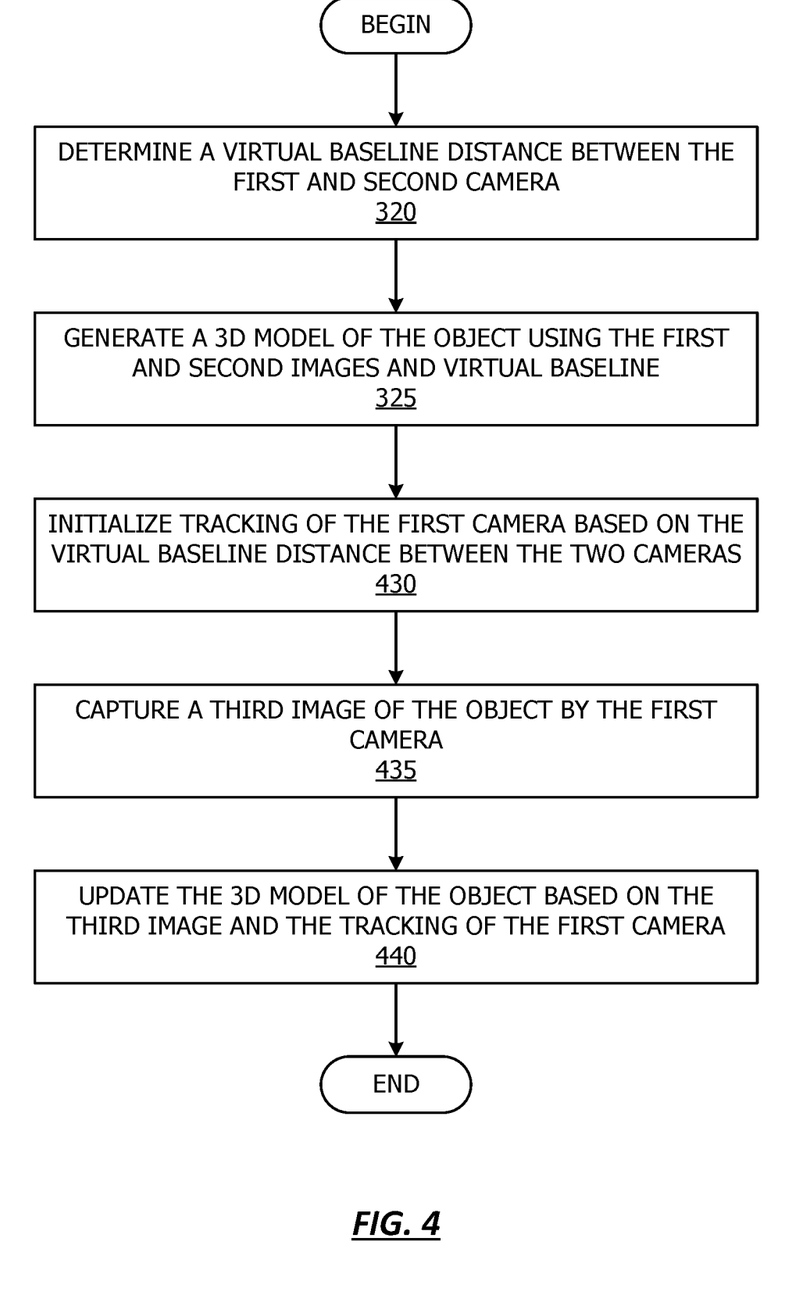
FIG. 4 shows, in flow chart form, an example method of updating 3D model, according to one or more embodiments.

FIG. 4 shows, in flow chart form, an example method of updating 3D model, according to one or more embodiments. In one or more embodiments, once a portion of a model is initially created using the dual camera system, the model may be updated using a single camera. In one or more embodiments, the system may use a tracking mechanism to determine proper placement and depth of future images of the object captured by a single camera.

In one or more embodiments, updating the model may rely on some actions performed as in FIG. 3. Thus, the flow chart depicted in FIG. 4 begins at 320 and a virtual baseline distance is determined between the first and second camera. Then, at 325, at least a portion of a 3D model of the object is generated using the first and second images obtained in 305 and 310.

The flow chart continues at 430 and a tracking mechanism is initialized for the first camera based on the virtual baseline distance between the two cameras. In one or more embodiments, the tracking system could be initialized for either the first or second camera. Further, in one or embodiments, once the spatial relationship between the two cameras is determined by the first set of images, then a relationship between the tracked camera and the object may be determined with a single camera by tracking the pose of the camera capturing further images of the object. For example, the object captured in the further image may contain at least a portion of the 3D model of the object that is generated using the first and second images obtained in 305 and 310. The pose of the camera could be determined based on the image position of the object in the further image and its corresponding 3D model of the object. For example, pose may be computed from 2D image and 3D model correspondences.

The flow chart continues at 435 and a third image of the object is captured by the first camera. Again, in one or more embodiments, the first camera may be either camera which is tracked. In one or more embodiments, the third image must overlap, at least in part, with a portion of the object captured in the first and second images.

The flow chart continues at 440 and the 3D model generated in 325 is updated based on the third image. The depth of the object in the third image may be determined, for example, using the tracking mechanism to determine a spatial relationship between the tracked camera and the object. Thus, the new position of the electronic device may also be tracked based on the tracked camera. In one or more embodiments, further images captured by the tracked camera may be used to enhance the 3D model as long as each image includes at least part of the field of view or object captured in a previous image used to generate the model.

Figure 5:
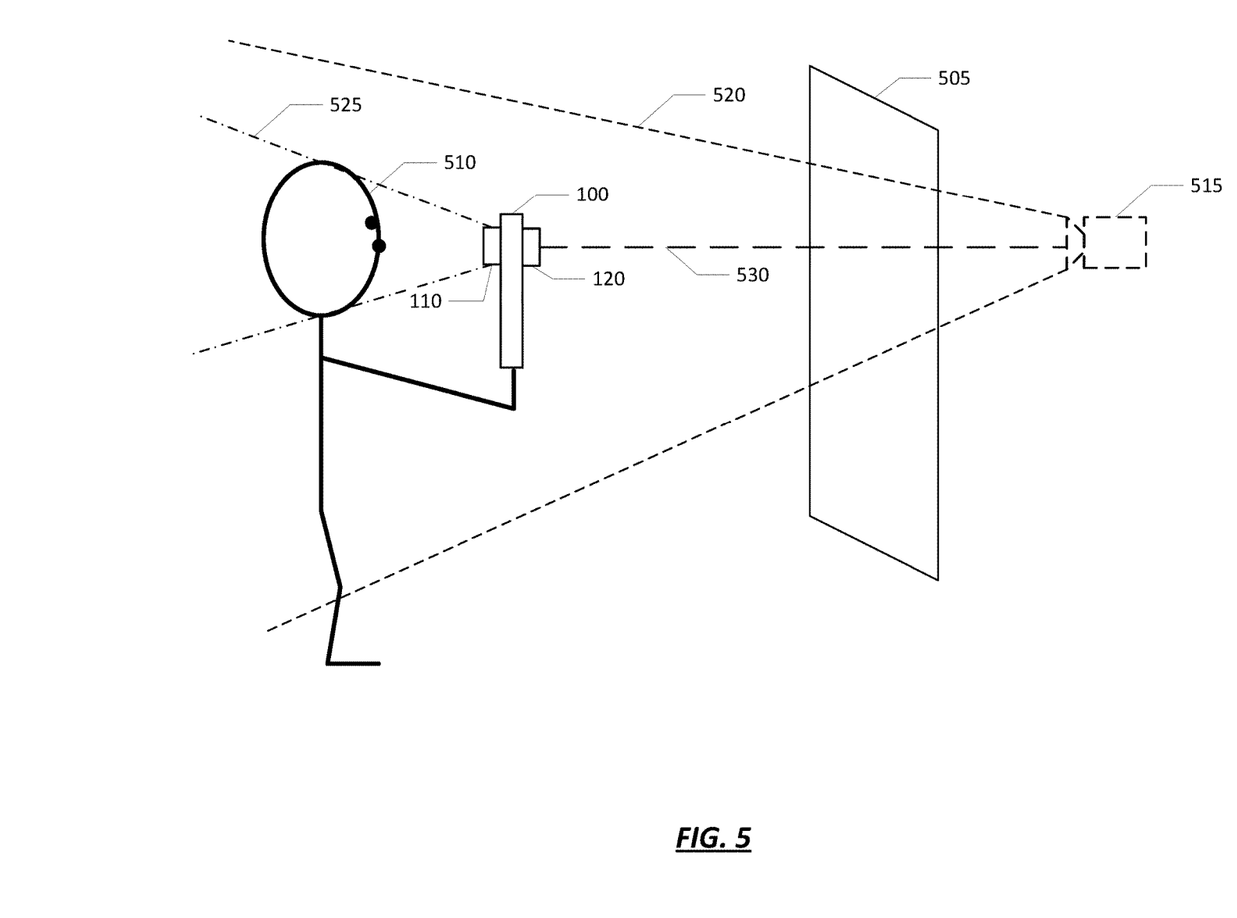
FIG. 5 shows an example system diagram of a 3D reconstruction method, according to one or more embodiments.

FIG. 5 shows an example system diagram of a 3D reconstruction method, according to one or more embodiments. As depicted, the electronic device 100 includes a multicamera system, with a front-facing camera 110 and a back-facing camera 120. The object to be modeled for purposes of this example is the head 510 of a user holding the electronic device. However, as described above, the object could be any object or scene captured by the multi-camera system. As shown, the object 510 is captured directly by front-facing camera 110, and in a reflection of a mirror 505 by back-facing camera 120.

As described above, the virtual baseline 530 may be determined between the front-facing camera 110 and the virtual back-facing camera 515. In one or more embodiments, the back-facing camera may capture a portion of the electronic device 100 as a reflection in the mirror 505. Thus, the electronic device may use visual markers either on the device itself, or on a display of the device, to determine the virtual distance of the virtual camera 515 to the electronic device 100. Using a known spatial relationship between the front facing camera 110 and the electronic device 100, and the virtual distance between the virtual camera 515 and the electronic device 100, the virtual baseline 530 may be established. That is, because the back-facing camera is capturing an image of the object 510 as it is reflected in a mirror, the virtual baseline 530 indicates the spatial relationship between the front-facing camera 110 and the location from where the back-facing camera 120 appears to capture an image of object 510. As described above, the object to be modeled must merely lie within the field of view of the front facing camera 525 and the field of view of the back-facing camera 520.

Figure 6:
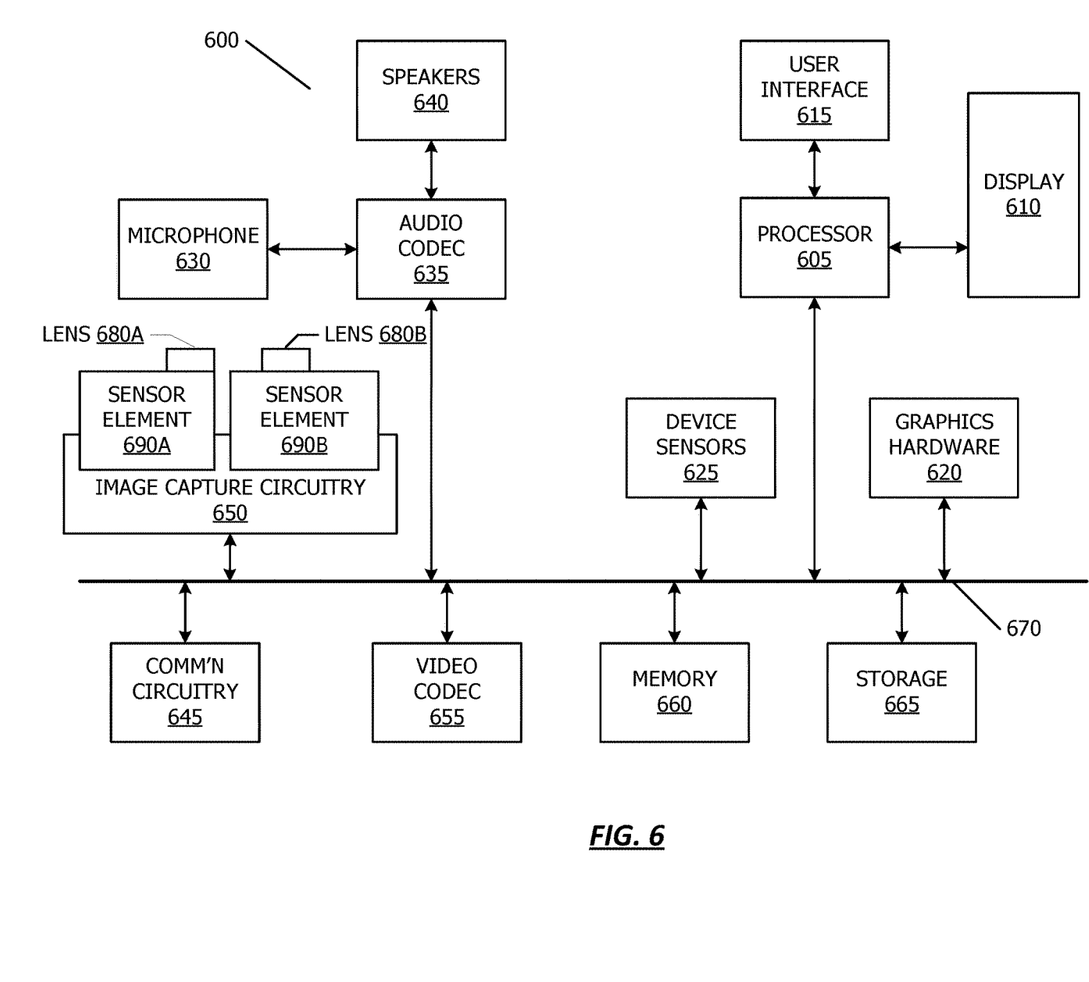
FIG. 6 shows, in block diagram form, a simplified multifunctional device according to one or more embodiments.

Referring now to FIG. 6, a simplified functional block diagram of illustrative multifunction device 600 is shown according to one embodiment. Multifunction electronic device 600 may include processor 605, display 610, user interface 615, graphics hardware 620, device sensors 625 (e.g., proximity sensor/ambient light sensor, accelerometer and/or gyroscope), microphone 630, audio codec(s) 635, speaker(s) 640, communications circuitry 645, digital image capture circuitry 650 (e.g., including camera system 100) video codec(s) 655 (e.g., in support of digital image capture unit 650), memory 660, storage device 665, and communications bus 670. Multifunction electronic device 600 may be, for example, a digital camera or a personal electronic device such as a personal digital assistant (PDA), personal music player, mobile telephone, or a tablet computer.

Processor 605 may execute instructions necessary to carry out or control the operation of many functions performed by device 600 (e.g., such as the generation and/or processing of images and single and multi-camera calibration as disclosed herein). Processor 605 may, for instance, drive display 610 and receive user input from user interface 615. User interface 615 may allow a user to interact with device 600. For example, user interface 615 can take a variety of forms, such as a button, keypad, dial, a click wheel, keyboard, display screen and/or a touch screen. Processor 605 may also, for example, be a system-on-chip such as those found in mobile devices and include a dedicated graphics processing unit (GPU). Processor 605 may be based on reduced instruction-set computer (RISC) or complex instruction-set computer (CISC) architectures or any other suitable architecture and may include one or more processing cores. Graphics hardware 620 may be special purpose computational hardware for processing graphics and/or assisting processor 605 to process graphics information. In one embodiment, graphics hardware 620 may include a programmable GPU.

Image capture circuitry 650 may include two (or more) lens assemblies 680A and 680B, where each lens assembly may have a separate focal length. For example, lens assembly 680A may have a short focal length relative to the focal length of lens assembly 680B. Each lens assembly may have a separate associated sensor element 690. Alternatively, two or more lens assemblies may share a common sensor element. Image capture circuitry 650 may capture still and/or video images. Output from image capture circuitry 650 may be processed, at least in part, by video codec(s) 665 and/or processor 605 and/or graphics hardware 620, and/or a dedicated image processing unit or pipeline incorporated within circuitry 665. Images so captured may be stored in memory 660 and/or storage 655.

Sensor and camera circuitry 650 may capture still and video images that may be processed in accordance with this disclosure, at least in part, by video codec(s) 655 and/or processor 605 and/or graphics hardware 620, and/or a dedicated image processing unit incorporated within circuitry 650. Images so captured may be stored in memory 660 and/or storage 665. Memory 660 may include one or more different types of media used by processor 605 and graphics hardware 620 to perform device functions. For example, memory 660 may include memory cache, read-only memory (ROM), and/or random access memory (RAM). Storage 665 may store media (e.g., audio, image and video files), computer program instructions or software, preference information, device profile information, and any other suitable data. Storage 665 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 660 and storage 665 may be used to tangibly retain computer program instructions or code organized into one or more modules and written in any desired computer programming language. When executed by, for example, processor 605 such computer program code may implement one or more of the methods described herein.

In one or more embodiments, utilizing a mirror to effectively increase a distance between two cameras in an electronic device may provide greater accuracy in many fields, such as SLAM, 3D reconstruction, tracking, and face pose and reconstruction. Because standard stereo systems may have a small distance between their two or more cameras, a large error or unstable performance for 3D reconstruction may be introduced. The various features described above provide a technique for using a multi-camera system for 3D reconstruction without the mechanical and physical limitations typically found when a multi-camera system is part of a single electronic device. The various techniques provided above may provide better scale for 3D modeling and reconstruction based on the accuracy improved by the increased baseline between the first and second camera.

The scope of the disclosed subject matter therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A method for 3D model construction, comprising:
   obtaining a first image of an object captured by a first camera of an electronic device, the first camera facing a first direction;
   obtaining a second image of the object captured by a second camera of the device, the second camera facing a second direction, wherein the second camera captures the second image of the object as a reflection in a mirror in front of the second camera;
   determining a virtual baseline distance between the first camera and the second camera based on an apparent distance of the first camera to the second camera as reflected in the mirror based on a reflected distance of at least part of the electronic device in the second image and a known spatial relationship between the first camera and the at least part of the electronic device; and
   generating at least a partial 3D model of the first object using the first image, the second image, and the virtual baseline distance.

2. The method of claim 1, wherein the first camera faces an object from a first surface of the electronic device, and wherein the second camera faces the mirror from an opposite surface from the first surface of the electronic device.

3. The method of claim 1, wherein determining a virtual baseline distance between the first camera and the second camera comprises:
   identifying the at least part of the electronic device in the second image,
   determining a distance between the electronic device and a mirrored position of the second camera based on characteristics of the electronic device in the second image, and
   determining the virtual baseline based on the determined distance between the electronic device and the mirrored position of the second camera.

4. The method of claim 1, further comprising:
   initializing a tracking mechanism using the first image, the second image, and the virtual baseline distance.

5. The method of claim 4, further comprising:
   capturing a third image by one of the first camera and the second camera, wherein the third image comprises at least part of the object; and
   updating the 3D model using the third image and a tracked camera pose of the one of the first camera and the second camera.

6. The method of claim 5, further comprising:
   determining a tracked position of the device according to the third image,
   wherein updating the 3D model comprises using the third image and the tracked position of the device according to the third image.

7. The method of claim 1, wherein generating at least a partial 3D model of the object comprises generating a true-to-scale model of the object.

8. A computer readable medium comprising computer readable code executable by one or more processors to:
   obtain a first image of an object captured by a first camera of an electronic device, the first camera facing a first direction;
   obtain a second image of the object captured by a second camera of the electronic device, the second camera facing a second direction, wherein the second camera captures the second image of the object as a reflection in a mirror;
   determine a virtual baseline distance between the first camera and the second camera based on an apparent distance of the first camera to the second camera as reflected in the mirror based on a reflected distance of at least part of the electronic device in the second image and a known spatial relationship between the first camera and the at least part of the electronic device; and
   generate at least a partial 3D model of the object using the first image, the second image, and the virtual baseline distance.

9. The computer readable medium of claim 8, wherein the first camera faces the object from a first surface of the electronic device, and wherein the second camera faces the mirror from an opposite surface from the first surface of the electronic device.

10. The computer readable medium of claim 8, wherein determining a virtual baseline distance between the first camera and the second camera comprises:
    identifying the at least part of the electronic device in the second image,
    determining a distance between the electronic device and a mirror based on characteristics of the electronic device in the second image, and
    determining the virtual baseline based on the determined distance between the electronic device and the mirror.

11. The computer readable medium of claim 8, further comprising computer readable code executable by one or more processors to:
   initialize a tracking mechanism using the first image, the second image, and the virtual baseline distance.

12. The computer readable medium of claim 11, further comprising computer readable code executable by one or more processors to:
   capture a third image by one of the first camera and the second camera, wherein the third image comprises at least part of the object; and
   update the 3D model using the third image and a tracked camera pose of the one of the first camera and the second camera.

13. The computer readable medium of claim 12, further comprising computer readable code executable by one or more processors to:
   determine a tracked position of the device according to the third image,
   wherein the computer readable code to update the 3D model comprises computer readable code to use the third image and the tracked position of the device according to the third image.

14. The computer readable medium of claim 8, wherein the computer readable code to generate at least a partial 3D model of the object comprises computer readable code to generate a true-to-scale model of the object.

15. A system for 3D model construction, comprising:
   a first camera of an electronic device directed in a first direction;
   a second camera of the electronic device directed in a second direction;
   one or more processors; and
   a memory coupled to the one or more processors and comprising computer readable code executable by the one or more processors to:
      obtain a first image of an object captured by the first camera;
      obtain a second image of the object captured by the second camera as a reflection in a mirror in front of the first camera;
      determine a virtual baseline distance between the first camera and the second camera based on an apparent distance of the first camera to the second camera as reflected in the mirror based on a reflected distance of at least part of the electronic device in the second image and a known spatial relationship between the first camera and the at least part of the electronic device; and
      generate at least a partial 3D model of the first object using the first image, the second image, and the virtual baseline distance.

16. The system of claim 15, wherein the first camera faces an object from a first surface of the electronic device, and wherein the second camera faces the mirror from an opposite surface from the first surface of the electronic device.

17. The system of claim 15, wherein the computer readable code to determine a virtual baseline distance between the first camera and the second camera comprises computer readable code to:
   identify the at least part of the electronic device in the second image,
   determine a distance between the electronic device and the mirror based on characteristics of the electronic device in the second image, and
   determine the virtual baseline based on the determined distance between the electronic device and the mirror.

18. The system of claim 15, further comprising computer readable code executable by one or more processors to:
   initialize a tracking mechanism using the first image, the second image, and the virtual baseline distance.

19. The system of claim 15, further comprising computer readable code executable by one or more processors to:
   capture a third image by one of the first camera and the second camera, wherein the third image comprises at least part of the object; and
   update the 3D model using the third image and a tracked camera pose of the one of the first camera and the second camera.

20. The system of claim 15, wherein the computer readable code to generate at least a partial 3D model of the object comprises computer readable code to generate a true-to-scale model of the object.

* * * * *